United States Patent
Kim et al.

(10) Patent No.: US 7,564,644 B2
(45) Date of Patent: Jul. 21, 2009

(54) ADAPTIVE DISTURBANCE REPRESSING METHOD AND APPARATUS, AND DISK DRIVE APPARATUS USING THE SAME

(75) Inventors: Nam-guk Kim, Anyang-si (KR); Sung-won Park, Seoul (KR); Sang-hoon Chu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/837,885

(22) Filed: Aug. 13, 2007

(65) Prior Publication Data

US 2008/0037158 A1    Feb. 14, 2008

(30) Foreign Application Priority Data

Aug. 14, 2006   (KR) .................. 10-2006-0076725

(51) Int. Cl.
*G11B 5/596* (2006.01)
(52) U.S. Cl. .................................. 360/78.14
(58) Field of Classification Search ........................ None
See application file for complete search history.

(56) References Cited

U.S. PATENT DOCUMENTS 6,496,320 B1    12/2002   Liu
7,268,968 B2 *   9/2007   Semba et al. ............ 360/77.02
7,319,570 B2 *   1/2008   Jia et al. .................. 360/77.02
7,345,841 B2 *   3/2008   Baugh et al. ................ 360/75
7,400,468 B2 *   7/2008   Kang et al. .............. 360/77.02

FOREIGN PATENT DOCUMENTS

| JP | 5-242509    | 9/1993  |
| JP | 10-312656   | 11/1998 |
| JP | 2001-210032 | 8/2001  |
| KR | 2001-17826  | 3/2001  |
| KR | 2003-20156  | 3/2003  |
| KR | 2006-89837  | 8/2006  |

OTHER PUBLICATIONS

Korean Office Action dated Jun. 25, 2007 issued in KR 2006-76725.

* cited by examiner

*Primary Examiner*—K. Wong
(74) *Attorney, Agent, or Firm*—Stanzione & Kim LLP (57) ABSTRACT

A method and apparatus to safely repress disturbances from being applied to a system from the surroundings in which the system is used. The method of adaptively repressing disturbances includes estimating frequency components of a disturbance applied to a system in a user environment; and optimizing parameter values determining characteristics of a disturbance compensating servo control loop including a disturbance observer, based on the estimated frequency components of the disturbance.

32 Claims, 8 Drawing Sheets

FIG. 11
Magnitude of the Disturbance Sensitivity Function

FIG. 12
Magnitude of the Disturbance Sensitivity Function

ADAPTIVE DISTURBANCE REPRESSING METHOD AND APPARATUS, AND DISK DRIVE APPARATUS USING THE SAME

CROSS-REFERENCE TO RELATED APPLICATIONS

This application claims priority under 35 U.S.C. §119(a) from Korean Patent Application No. 10-2006-0076725, filed on Aug. 14, 2006, in the Korean Intellectual Property Office, the disclosure of which is incorporated herein in its entirety by reference.

BACKGROUND OF THE INVENTION

1. Field of the Invention

The present general inventive concept relates to a disturbance compensation method and apparatus, and more particularly, to a method and apparatus to safely repress disturbances from being applied to a system from the surroundings in which the system is used.

2. Description of the Related Art

The present general inventive concept is related to inventions disclosed in Korean Patent Publication No. 2001-017826 and Japanese Patent Publication No. 1993-242509, which are hereby incorporated by reference.

Korean Patent Publication No. 2001-017826 relates to technology that measures the amount of disk unbalance by analyzing a vibration frequency of a hard disk drive, and Japanese Patent Publication No. 1993-242509 relates to technology that improves anti-disturbance characteristics of an optical disk drive.

A conventional hard disk drive is a data storage system that contributes to the operation of a computer system by reading data written on a disk through a magnetic head or writing data on the disk through the magnetic head. As hard disk drives increase in terms of capacity, density, and compactness, the density in a rotating direction of the disk of the hard disk drive (bits per inch (BPI)) and the density in a radial direction of the disk of the hard disk drive (tracks per inch (TPI)) have increased, and thus hard disk drives require finer operating controlling mechanisms.

The purpose of the controlling mechanisms is to follow the track of a hard disk drive by keeping the magnetic head in the center of a target track of the hard disk drive. However, many disturbances to the hard disk drive can cause a tracking error. Particularly, a microdrive of a portable device is especially susceptible to such disturbances such as a vibration.

Thus, when a hard disk drive experiences disturbances, the effects of the disturbances cause a position error signal to immediately appear, and reduce the read/write performance of the hard disk drive. Accordingly, the conventional hard disk drive is designed with a built-in controller to detect a characteristic of an applied disturbance and to compensate for the applied disturbance in order to reliably maintain the read/write performance when the hard disk drive is subjected to the disturbances.

However, external vibrations being applied to a hard disk drive often have different frequency ranges and phases depending on the conditions and circumstances. Even when a controller with a high gain is used to remove the effects of these external vibrations, the use of the controller compromises the stability of the entire system.

A conventional "Q filter" disturbance observer, which is used to remove the effects of the disturbances, has fixed frequency characteristics for stable system operation, but the "Q filter" disturbance observer is unable to effectively remove the effects of the disturbances applied to the system from the surroundings in which the system is used.

SUMMARY OF THE INVENTION

The present general inventive concept provides an adaptive disturbance repressing method and apparatus to minimize a decrease in system capacity caused by disturbances while providing system stability in various operating environments, and a disk drive apparatus using the method and apparatus. The present general inventive concept also provides a computer readable medium to store a program to execute the above method.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of adaptively repressing disturbances, including estimating one or more frequency components of a disturbance applied to a system in a user environment and optimizing one or more parameter values corresponding to one or more characteristics of a disturbance compensating servo control loop including a disturbance observer, based on the estimated one or more frequency components of the disturbance.

The estimating operation may also include detecting a servo signal that responds to a servo control of the system and is outputted, with the disturbance observer in a disabled state, Fast Fourier Transforming the detected servo signal and estimating a largest frequency component of the Fast Fourier Transformed detected servo signal to be a disturbance frequency component.

The optimizing operation may also include reading the one or more parameter values required to optimize a gain margin of a servo control system corresponding to the one or more frequency components estimated in the estimating operation and one or more disturbance repressing characteristics, from a look-up table and varying the one or more parameter values required to determine a transfer function of a disturbance compensating control loop from the one or more parameter values read in the reading operation.

The one or more parameter values may correspond to one or more characteristics of a disturbance sensitivity transfer function.

The parameter values may correspond to one or more characteristics of a variable filter included in the disturbance observer.

The foregoing and/or other aspects and utilities of the present general inventive concept may also be achieve by providing an adaptive disturbance repressing apparatus including a disturbance observer to receive a control input signal to control a plant and a servo output signal of the plant corresponding to the control input signal, and to estimate a disturbance value applied to the plant as a variable disturbance sensitivity transfer function according to one or more parameter values of a variable filter disposed at a feedback of a control loop, a subtracter to subtract the disturbance value estimated by the disturbance observer from a control signal generated in the control loop, and to generate the control input signal to control the plant and a controller to estimate a frequency component of a disturbance applied to the plant in a user environment, and to vary the one or more parameter values of the variable filter based on the frequency component of the disturbance.

The disturbance observer may also include a nominal plant inverse modeling tool having response characteristics, to receive a servo output signal of the plant and output a sum of the control input signal of the plant and the disturbance value applied to the plant, a subtracter to subtract the control input signal of the plant from the output signal of the nominal plant inverse modeling tool and a variable filter to receive and to filter the subtracted output signal of the subtracter with one or more frequency characteristics corresponding to the varied one or more parameter values of the variable filter.

The one or more parameter values may correspond to a pole, zero, and a gain of the variable filter.

The foregoing and/or other aspects and utilities of the present general inventive concept may also be achieved by providing a disk drive apparatus including a disk to store data, a head to write data on the disk or to read the data from the disk, a servo controller to estimate head movement data values including a position value, a speed value, and a bias value of the head from a servo signal read by the head, and to generate a control signal based on the estimated head movement data values, a disturbance observer using a tool designed as an inverse of a function modeling a head driving system, to estimate a disturbance value applied to the head driving system from the servo signal through one or more disturbance sensitivity transfer function characteristics that vary according to one or more parameter values of a variable filter disposed at a feedback of a control loop, a subtracter to subtract the disturbance value estimated by the disturbance observer from the control servo signal, and to generate a disturbance compensating control signal, a VCM (voice coil motor) driver to generate a current to move the head according to the disturbance compensating control signal and a system controller to estimate a disturbance frequency component applied to the head driving system in a user environment, and to optimize the one or more parameter values of the variable filter based on the frequency component of the estimated disturbance applied to the head driving system in the user environment.

The foregoing and/or other aspects and utilities of the present general inventive concept may also be achieved by providing a computer readable medium containing computer readable codes to perform an adaptive disturbance repressing method, the method including estimating frequency components of a disturbance applied to a system in a user environment and optimizing parameter values corresponding to characteristics of a disturbance compensating servo control loop including a disturbance observer, based on the estimated frequency components of the disturbance.

The foregoing and/or other aspects and utilities of the present general inventive concept may also be achieved by providing a disturbance repressing apparatus, including a variable filter having a plurality of parameters and a controller coupled to the variable filter to analyze one or more disturbance frequency components of a disturbance and to vary at least one of the plurality of parameters of the variable filter based on the analyzed one or more disturbance frequency components to repress the disturbance.

The foregoing and/or other aspects and utilities of the present general inventive concept may also be achieved by providing a disk drive apparatus, including a disk to store data, a head to read the data from and to write the data to the disk, and a disturbance repressing apparatus, including a variable filter having a plurality of parameters and a controller coupled to the variable filter to analyze one or more disturbance frequency components of a disturbance and to vary at least one of the plurality of parameters of the variable filter based on the analyzed one or more disturbance frequency components in order to repress the disturbance and to maintain reliability of the read and write performance of the head.

The foregoing and/or other aspects and utilities of the present general inventive concept may also be achieved by providing a method of operating a disk drive apparatus, the method including writing data to a disk, reading data from the disk, analyzing one or more disturbance frequency components of a disturbance capable of reducing reliability of the writing operation and the reading operation and varying at least one of a plurality of parameters of a variable filter based on the analyzed disturbance frequency components in order to repress the disturbance and to maintain the reliability of the writing operation and the reading operation.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

A hard disk drive according to an embodiment of the present general inventive concept, such as a mechanical device, is composed of a head disk assembly (HDA) 10 coupled to an electronic circuit.

Figure 1:
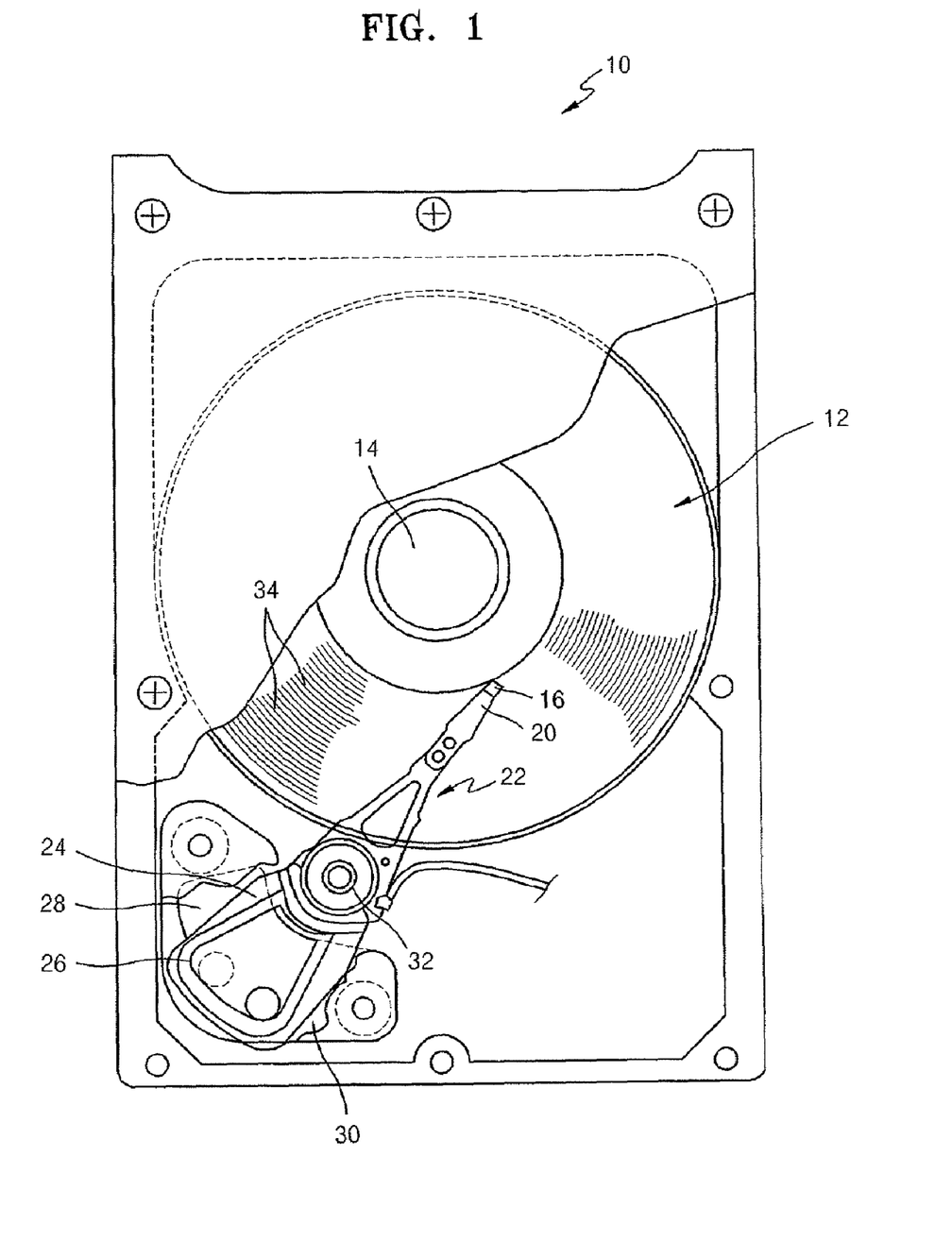
FIG. 1 illustrates a plan view of a head disk assembly of a hard disk drive according to an embodiment of the present general inventive concept.

FIG. 1 is a plan view of the HDA 10 of a hard disk drive, according to an embodiment of the present general inventive concept. The HDA 10 includes at least one magnetic disk 12 that is rotated by a spindle motor 14. The HDA 10 also includes a transducer 16 disposed proximate to a surface of the magnetic disk 12.

The transducer 16 detects magnetic fields of each magnetic disk 12 and magnetizes each magnetic disk 12 to read or write data on the magnetic disk 12. A conventional transducer is coupled to the surface of each magnetic disk. Although a single transducer is being described as the transducer 16, the transducer 16 can also be a combination of a separate writing transducer to magnetize the magnetic disk 12 and a reading transducer that detects the magnetic field of the magnetic disk 12. The reading transducer is a magneto-resistive (MR) device. Also, the transducer 16 can be called a head.

The transducer 16 may be combined with a slider 20. The slider 20 is formed in a structure that acts as an air bearing between the transducer 16 and the surface of the magnetic disk 12. The slider 20 is coupled to a head gimbal assembly 22. The head gimbal assembly 22 is attached to an actuator arm 24 having a voice coil 26. The voice coil 26 of a voice coil motor (VCM) 30 is proximally disposed to a magnetic assembly 28. A current supplied to the voice coil 26 of the VCM generates a torque to turn the actuator arm 24 relative to the bearing assembly 32. The rotation of the actuator arm 24 moves the transducer 16 across the surface of the magnetic disk 12.

Data is stored in annular tracks 34 of the magnetic disk 12. Each of the tracks 34 usually includes a plurality of sectors. Each of the sectors includes a data field and an identification field. The identification field in each of the sectors includes a gray code to identify each of the sectors and each of the tracks 34 (cylinder). The transducer 16 moves across the surface of the magnetic disk 12 to read or write data on other tracks 34 on the surface of the magnetic disk 12.

Figure 2:
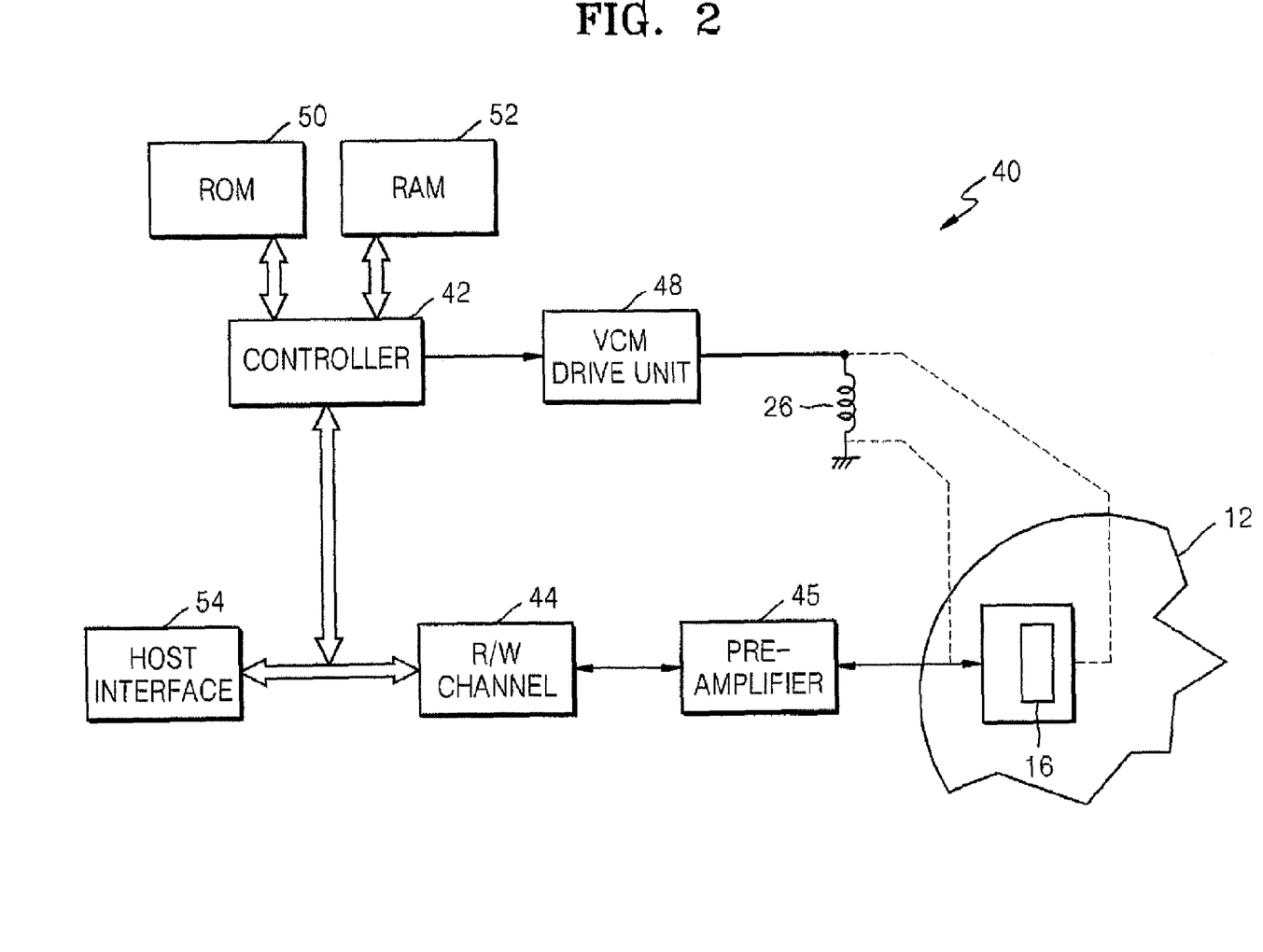
FIG. 2 is a block diagram illustrating an electronic circuit of a hard disk drive according to an embodiment of the present general inventive concept.

FIG. 2 is a block diagram illustrating an electronic circuit 40 to control a hard disk drive, according to an embodiment of the present general inventive concept. The electronic circuit 40 includes a magnetic disk 12, a head 16, a controller 42, a read/write (R/W) channel circuit 44, a pre-amplifier 45, a VCM drive unit 48, a read only memory (ROM) device 50, a random access memory (RAM) device 52, and a host interface circuit 54.

Figure 6:
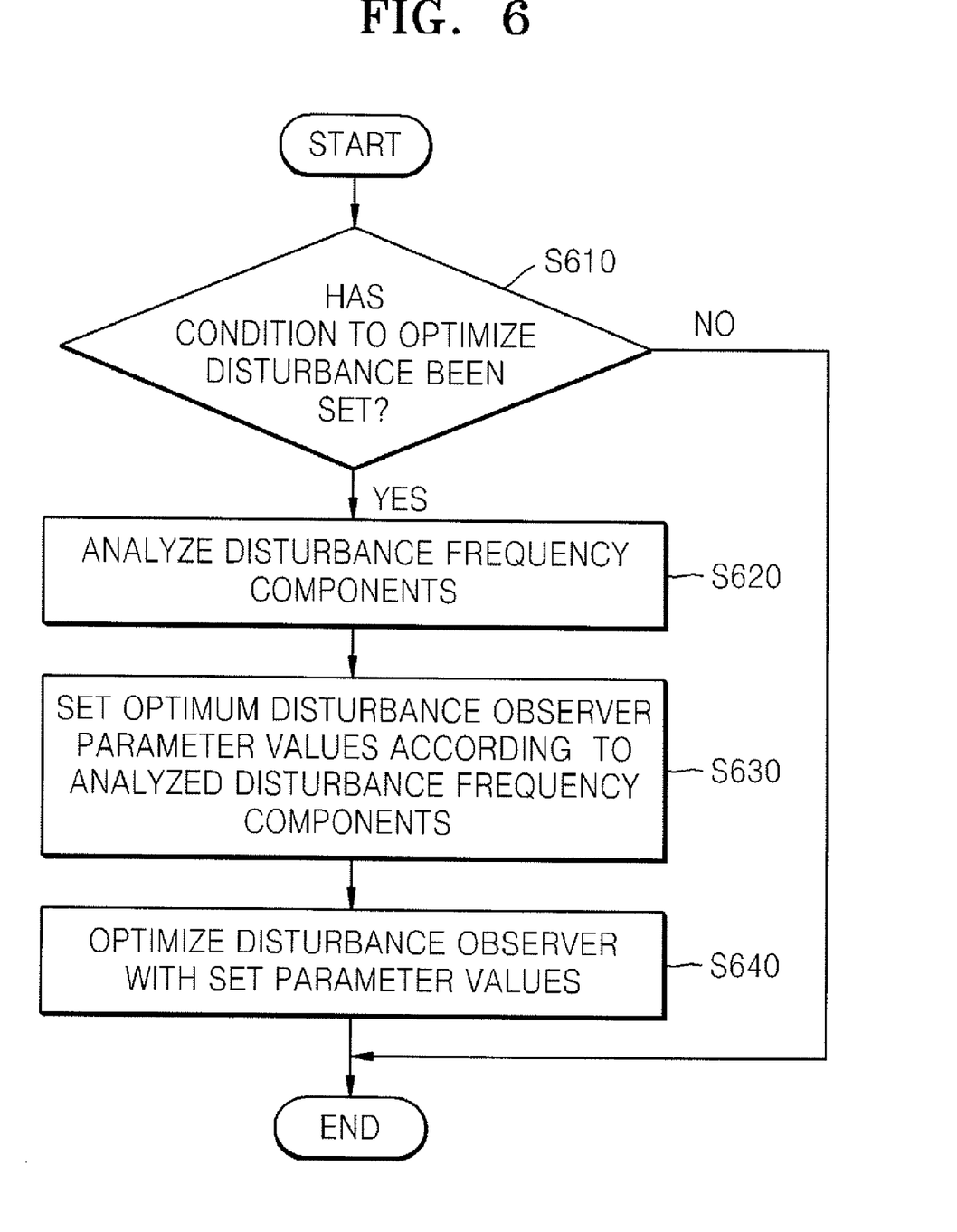
FIG. 6 is a flowchart illustrating a disturbance repressing method according to an embodiment of the present general inventive concept.

The ROM device 50 stores various commands and data used by the controller 42 to execute a software routine. The ROM device 50 also stores the programs to perform the adaptive disturbance repressing method according to an embodiment of the present general inventive concept as illustrated in the flowchart of FIG. 6.

The ROM device 50 also stores lookup table data that divides frequency bands of the disturbances into a plurality of sections, and sets parameter values to have optimum disturbance inhibiting characteristics for each of the frequency bands. In an embodiment of the present general inventive concept, the lookup table data may be stored on a system cylinder region of the magnetic disk 12. The system cylinder region is a region on which data related to the hard disk drive is stored, that is, a region that cannot be accessed by a user, and can be called a maintenance cylinder region. A detailed description of the above lookup table will be given below.

The RAM device 52 stores data read from the ROM device 50 or magnetic disk 12 required to operate the hard disk drive. The RAM device 52 also stores data that is generated during the operation of the hard disk drive according to an embodiment of the present general inventive concept.

The controller 42 analyzes a command received from a host device (not Illustrated) through the host interface circuit 54, and performs an operation according to the analysis results of the controller 42. Then, the controller 42 supplies a control signal to the VCM drive unit 48 to control the VCM and the movement of the head 16.

A general description of the operation of a disk drive will be provided below.

In data read mode, the disk drive amplifies an electrical signal from the magnetic disk 12 detected through the head 16 by the pre-amplifier 45. Then, the R/W channel circuit 44 encodes the signal read from the magnetic disk 12 into a digital signal according to the timing of a read sector pulse generated by the controller 42, and converts the digital signal to stream data and sends the stream data through the host interface circuit 54 to a host device (not illustrated).

In data write mode, the disk drive receives data from the host device through the host interface circuit 54, the controller 42 adds error correcting parity symbols to the data, the data stored in a buffer is sequentially outputted and converted through the R/W channel circuit 44 to a binary data stream compatible with the write channels of the magnetic disk 12. The head 16 then writes the binary data stream on the magnetic disk 12 in relation to a sector pulse using a write current amplified by the pre-amplifier 45.

A description of a conventional disturbance repressing device will now be provided below.

Figure 3:
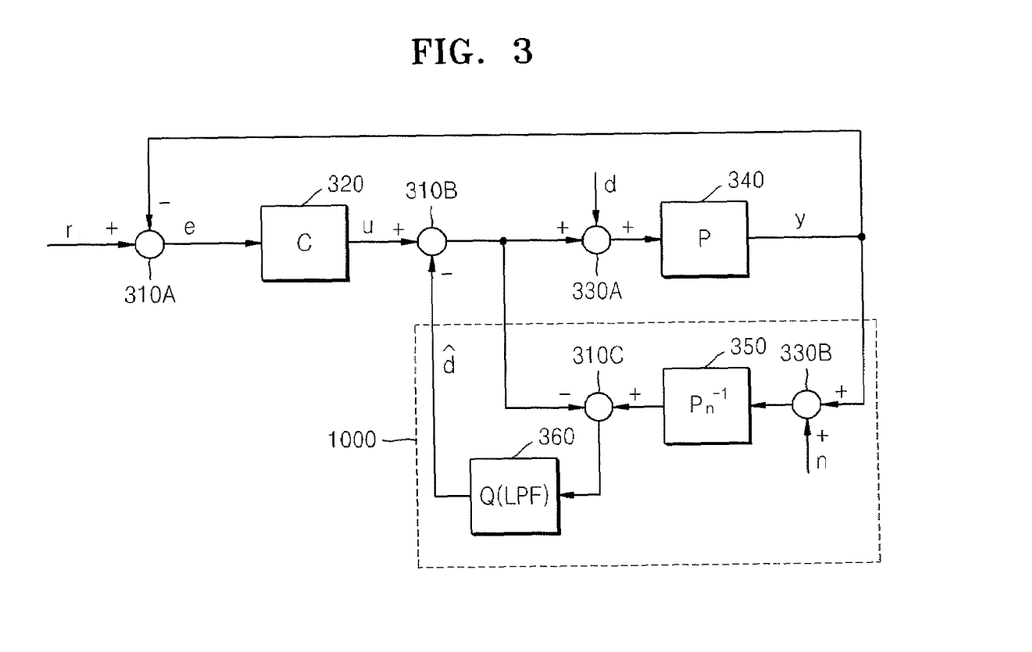
FIG. 3 is a block diagram illustrating an electronic circuit of a conventional disturbance repressing device used in a servo control system.

Referring to FIG. 3, the disturbance repressing device includes subtracters 310A, 310B, and 310C, a servo controller 320, adders 330A and 330B, a plant 340, a nominal plant inverse modeling tool 350, and a Q filter 360. The plant 340, for example, may be a head driving system.

The conventional disturbance observer 1000 includes the nominal plant inverse modeling tool 350, the Q filter 360, the subtracter 310C, and the adder 330B.

Also, the adders 330A and 330B equivalently represent a disturbance (d) applied to the plant 340 and noise (n) existing in the plant 340.

In a dynamic system such as a disk drive that includes a mechanically rotating part, disturbances are potentially overriding elements that usually reside in low frequency ranges. Accordingly, when designing a servo control system of a disk drive, a high gain of an open loop transfer function in a low frequency is commonly designed. The increase of the gain of the open loop transfer function in a low frequency is simply accomplished by increasing the gain of the entire servo control system. In such an increase in the gain of the entire servo control system, however, the margin of system stability is reduced, and errors occur. A controller, in addition to the main controller servo controller 320, may be incorporated to compensate for the disturbances. The conventional disturbance observer 1000 is widely known to employ a method of increasing the gain of the open loop transfer function in a low frequency.

The important parameters to consider when designing the conventional disturbance observer 1000 are the model type of the servo control system and the Q filter 360 used to output signals. The Q filter 360 used to output signals is designed with noise reduction features and a non-casual characteristic according to a relative degree of the servo control system.

The basic principle of a disturbance observer is based on the theory that if the input applied to the servo control system, the actual output, and the plant are known, then a disturbance applied to the servo control system can be calculated. However, in actuality, the plant cannot be completely modeled, and noise cannot completely be removed, so that an error-free calculation of the disturbance on the system is unlikely. Moreover, an inverse of a transfer function in a nominal model of a conventional dynamic system becomes a non-causal system, so that in order to calculate the inverse transfer function in the nominal model, a so-called Q filter having a degree higher than a relative degree of a plant nominal model (a degree derived by subtracting a numerator degree from a denominator degree of the nominal model transfer function) must be used.

A conventional disturbance observer uses a low pass filter with a degree higher than a relative degree of a plant nominal model in order to avoid the above restrictions and more accurately observe the disturbances.

The disturbance $\hat{d}$ observed by the conventional disturbance observer 1000 in FIG. 3 can be expressed by Equation 1 below.

$$\hat{d} = G_{u\hat{d}}u + G_{d\hat{d}}d + G_{n\hat{d}}n \quad \text{Equation 1}$$

$$= Q\left[\frac{PP_n^{-1} - 1}{1 - (PP_n^{-1} - 1)Q}u + \frac{PP_n^{-1}}{1 - (PP_n^{-1} - 1)Q}d + \frac{P_n^{-1}}{1 + (PP_n^{-1} - 1)Q}n\right]$$

where, $G_{u\hat{d}}$ is a transfer function from a control input u to observed disturbance $\hat{d}$, $G_{d\hat{d}}$ is a transfer function from an actual inputted disturbance d to observed disturbance $\hat{d}$, and $G_{n\hat{d}}$ is a transfer function from measured noise n to observed disturbance $\hat{d}$.

Here, it is assumed that the plant nominal model is the same as the plant 340 of the disturbance observer 1000. Also, in Equation 1, when Q=1, the result is the relation expressed in Equation 2 below:

$$G_{u\hat{d}}=0, G_{d\hat{d}}=1, G_{n\hat{d}}=P_n^{-1} \quad \text{Equation 2}$$

Here, in Equation 1, when Q=0, the result is the relationship in Equation 3 below:

$$G_{u\hat{d}}=0, G_{d\hat{d}}=0, G_{n\hat{d}}=0 \quad \text{Equation 3}$$

In a conventional dynamic system, measured noise n resides in a high frequency range, and mechanical disturbances reside in a low frequency range. Thus, when Q in Equations 2 and 3 is designed as a low pass filter, the measured noise n can be reduced while the mechanical disturbances are observed.

Moreover, in a conventional low frequency range in plant modeling and that accurate modeling is possible, the actual mechanical disturbances of the low frequency range can easily be observed through Equation 2. Accordingly, the low pass filter is used with a filter gain of 1 for the low frequency range, so that disturbances or mechanical disturbances in the low frequency range can be accurately observed and the measured noise n in the high frequency range can be reduced at the same time.

Likewise, a conventional disturbance observer is designed as an add-on type of system that is used to improve the performance of an existing main control loop.

If an existing main control loop has been designed to have a sufficiently high control gain in a low frequency range, a disturbance that is to be compensated for by the disturbance observer resides in a frequency range between low and high frequency ranges, and a fixed low pass filter is added to a frequency range appropriate to the disturbance observer, and thus an unnecessary increase arises in the control gain of the low frequency range. This substantially reduces the stability margin of the system, so that there is a limit imposed on the bandwidth range of a disturbance that can be compensated for by the disturbance observer.

Figure 4:
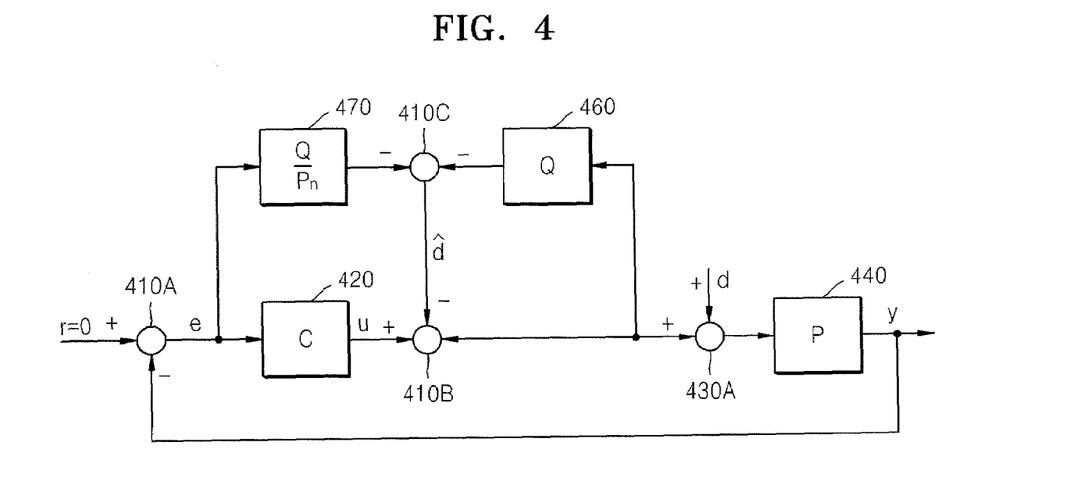
FIG. 4 is an equivalent circuit diagram of the electronic circuit of the conventional disturbance repressing device as illustrated in FIG. 3.

FIG. 4 is an equivalent circuit diagram of the electronic circuit of the conventional disturbance repressing device as illustrated in FIG. 3. For example, the electronic circuit of FIG. 4 includes subtracters 410A and 410B, adders 430A and 410C, a plant 440, a Q filter 460, and controllers 420 and 470. The calculation of the inverse of the actual nominal model and the Q filter 360 in FIG. 3 is performed with an additional controller, so that if the calculation of the inverse of the actual nominal model and the Q filter 360 are similarly reconfigured in FIG. 4, the calculation of the inverse of the actual nominal model and the Q filter 360 can be expressed by Equation 4 below. Here, the equivalent transfer function of the additional controller is expressed in Equation 4.

$$C = \frac{P_n C + Q}{(1 - Q)P_n} \quad \text{Equation 4}$$

where,

Pn is transfer function of a nominal plant model,

Q is transfer function of Q filter, and

C is transfer function of a controller.

When the Q filter 360 is designed as a conventional low pass filter and the frequency thereof is 0 Hz, the filter value is (1,0). In this case, the DC gain is infinity, so that the reduction characteristics of low frequency disturbances improve. However, a conventional feedback controller is designed from the perspective of a sensitivity transfer function to improve the reduction characteristics of disturbances in a low frequency range at the cost of not improving disturbances in a high frequency range and compromising the stability margin of the system.

Figure 7:
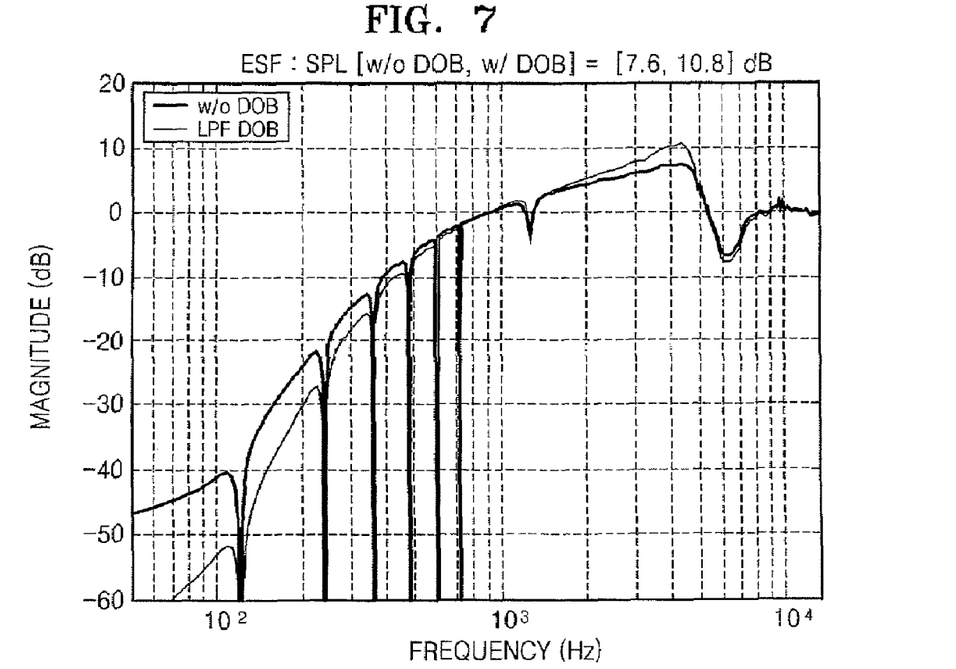
FIG. 7 is a graph illustrating characteristics of a sensitivity transfer function of a control loop when a conventional disturbance observer with a fixed low pass filter is used.
Figure 8:
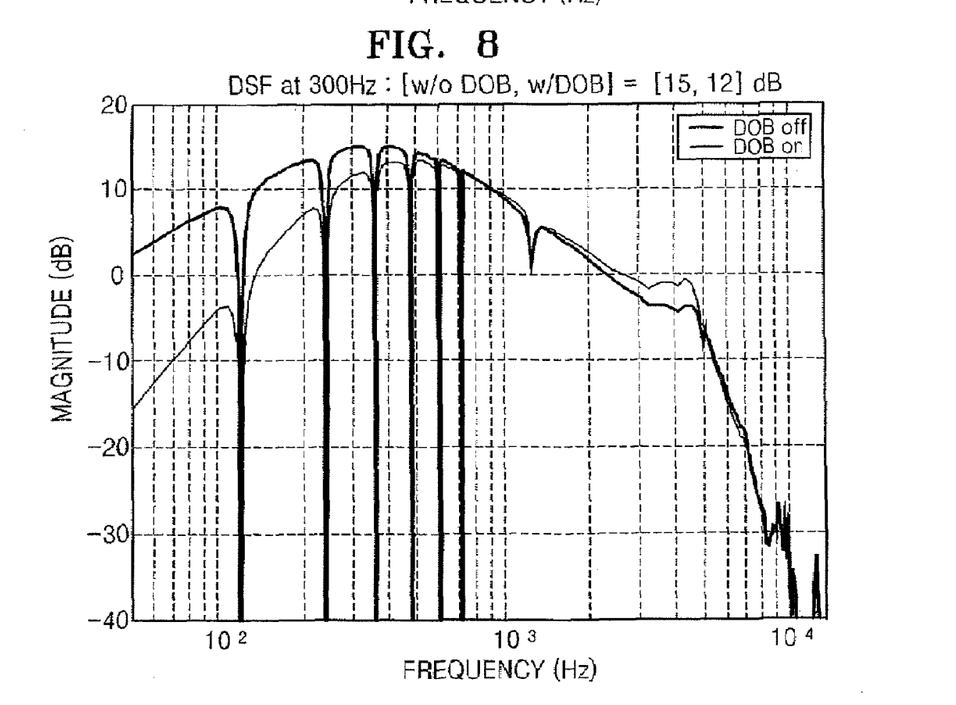
FIG. 8 is a graph illustrating characteristics of a disturbance sensitivity transfer function of a control loop when a conventional disturbance observer with a fixed low pass filter is used.

FIG. 7 is a graph illustrating characteristics of a sensitivity transfer function of the conventional disturbance observer 1000 in an ON/OFF state with the Q filter 360 installed as a low frequency-pass filter, and FIG. 8 is a graph illustrating the disturbance sensitivity transfer function of the conventional disturbance observer 1000 in an ON/OFF state with the Q filter 360 installed as a low pass filter.

Referring to FIG. 7, when a nominal controller sufficiently reduces low frequency disturbances and is coupled to the conventional disturbance observer 1000 with an additional low pass filter, the low frequency characteristic of the system is unnecessarily worsened by over inhibiting the low frequency disturbance characteristics and the stability margin is also highly decreased, so that the sensitivity transfer function of the conventional disturbance observer 1000 is substantially amplified to a frequency range of several KHz.

Referring to FIG. 8, when the disturbance sensitivity transfer function of the conventional disturbance observer 1000 unnecessarily limits the low frequency range, there is no significant improvement in a frequency range greater than 500 Hz.

To offset this unfavorable condition, the present general inventive concept uses a variable filter capable of varying the filtering characteristics of the variable filter in terms of a center frequency, bandwidth, gain, etc., according to user conditions of a disk drive, instead of a low pass filter with a fixed bandwidth using the Q filter 360 in the disturbance observer 1000.

Figure 5:
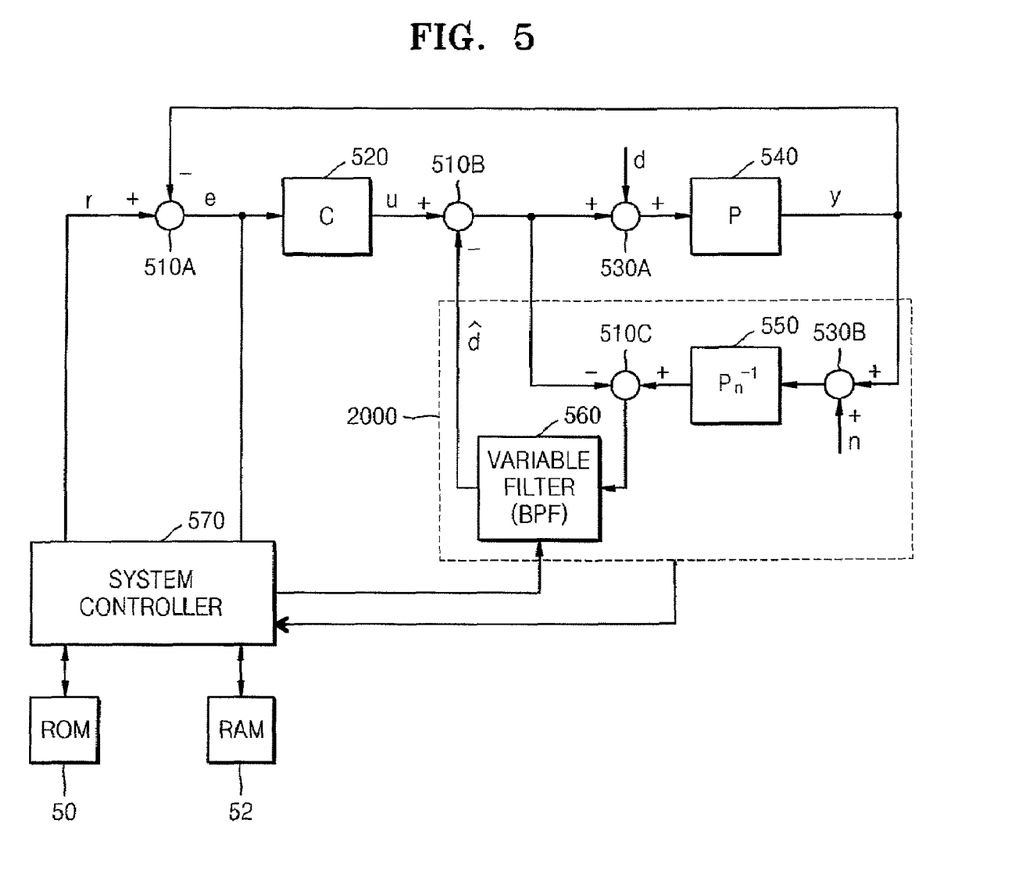
FIG. 5 is a block diagram illustrating an electronic circuit of a disturbance repressing device, according to an embodiment of the present general inventive concept.

FIG. 5 is a block diagram illustrating an electronic circuit of an adaptive disturbance repressing apparatus, according to an embodiment of the present general inventive concept.

Referring to FIG. 5, the adaptive disturbance repressing apparatus according to an embodiment of the present general inventive concept includes subtracters 510A, 510B, and 510C, a servo controller 520, adders 530A and 530B, a plant 540, a nominal plant inverse modeling tool 550, a variable filter 560, a system controller 570, a ROM device 50, and a RAM device 52. The plant 540, for example, may be a head driving system.

A disturbance observer 2000 includes the nominal plant inverse modeling tool 550, the variable filter 560, the adder 530B, and the subtracter 510C. Also, the servo controller 520 and the system controller 570 are controllers included in the controller 42 of FIG. 2.

Also, the adders 530A and 530B equivalently represent disturbance (d) applied to the plant 540 and noise (n) existing in the plant 540.

The adaptive disturbance repressing apparatus according to an embodiment of the present general inventive concept, which is applied to a disk drive servo controlling system as an embodiment herein, is not limited thereto and may be applied to a variety of servo controlling systems.

When the present general inventive concept is applied to a servo controlling system of a disk drive, the plant 340 may be a head driving system.

The servo controller 520 receives as an input an error signal (e) according to a difference between a reference signal (r) of the system controller 570 and a servo output signal (y) of the plant 540, calculates position, velocity, and bias values, and uses the calculated position, velocity, and bias values to calculate a control input signal (u). The error signal (e) in the disk drive may be a position error signal in an on-track mode.

The actual plant (P) characteristics of a conventional system cannot accurately be determined, so that a modeled plant (Pn) is modeled after a lower degree model for designing convenience. The difference between the modeled plant (Pn) and an actual plant (P) is usually largely concentrated in the higher frequency ranges, and the difference between the modeled plant (Pn) and the actual plant (P) in the lower frequency ranges is insignificant. Therefore, when it is assumed that the modeled plant (Pn) is the same as the actual plant (P) and measured noise (n) does not exist, a disturbance (d) may be obtained by calculating the difference between the product of the control input signal (u) and the product of the control output signal (y) and the inverse of the modeled plant ($Pn^{-1}$). However, in a conventional physical system, because the degree of a denominator of a transfer function is greater than the degree of a numerator of the transfer function of the modeled plant (Pn), and in order to calculate the inverse of the modeled plant ($Pn^{-1}$), the measured output from the plant must be differentiated by an amount equal to the degree of the denominator of the transfer function minus the degree of the numerator of the transfer function of the modeled plant (Pn).

However, in an actual system, high frequency noise (n) exists, so that it is very unlikely to derive an inverse of the modeled plant ($Pn^{-1}$) through the differential. To solve this problem, in an embodiment of the present general inventive concept, a variable filter 560 is added. The degree of the denominator minus the degree of the numerator of the transfer function of the variable filter 560 is designed to be greater than the degree of the denominator minus the degree of the numerator of the transfer function of the modeled plant (Pn), so that a differential can be avoided. When the variable filter 560 is designed as a band pass filter having a high degree, the system controller 570 is designed to variably adapt according to the user environment.

Using this method, the nominal plant inverse modeling tool 550 and the variable filter 560 are designed accordingly.

Figure 9:
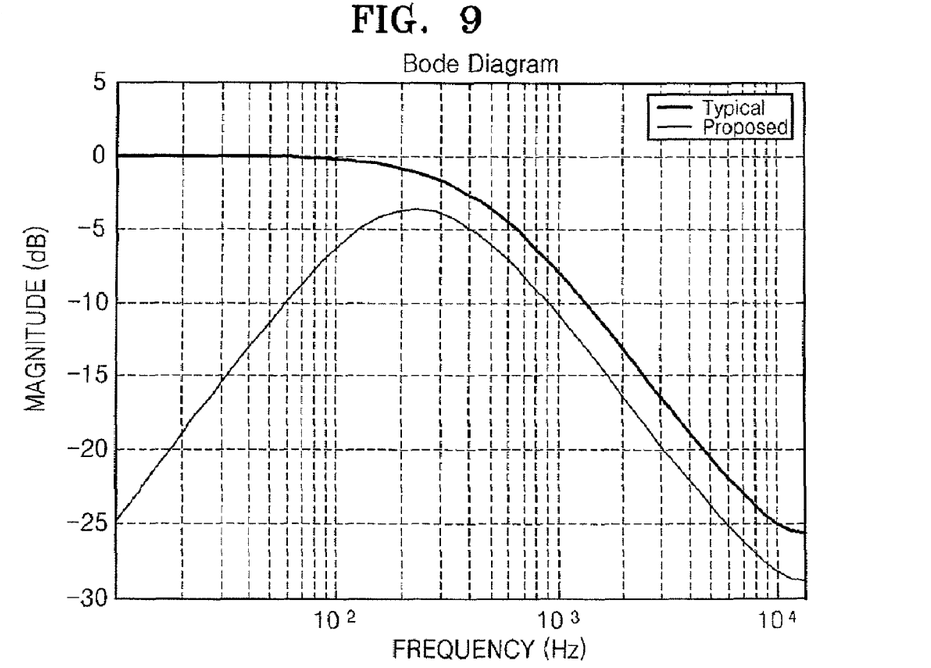
FIG. 9 is a graph illustrating exemplary transfer function characteristics of a variable filter used in a disturbance observer according to an embodiment of the present general inventive concept.

FIG. 9 illustrates frequency response characteristics of a band pass filter used as the variable filter 560 of FIG. 5 according to an embodiment of the present general inventive concept. The disturbance observer 2000 is designed to not have an actual disturbance reflected as is by a calculated disturbance in a pass bandwidth through the variable filter 560. Instead, the parameters of the variable filter 560 are varied so that all the servo characteristics including those of the disturbance observer 2000 can optimally reduce disturbances and retain a high degree of reliability.

The transfer function Q of the variable filter 560 can be expressed in Equation 5 below.

$$Q = \frac{B(z)}{A(z)} = g \frac{(z - z_1) \cdots (z - z_m)}{(z - p_1) \cdots (z - p_n)} \qquad \text{Equation 5}$$

where, g is gain of a Q filter, $p_1, \ldots, p_n$ are values of pole points, and $z_1, \ldots, z_m$ are values of zero points.

Here, a pole, zero, and gain of the variable filter 560 have bandwidth pass characteristics in a region largely effected by external disturbances, and are determined in order to increase stability.

The system controller 570 varies the parameters of the pole, zero, and gain of the variable filter 560 according to disturbance frequency components.

The parameter values of the pole, zero, and gain of the variable filter 560 are determined to have a sensitivity transfer function of a servo control loop and a disturbance sensitivity transfer function to effectively inhibit disturbances without reducing system stability according to each disturbance bandwidth and the determined parameter values store in the ROM device 50 or a system cylinder of the magnetic disk 12 as a lookup table type. The optimum parameter values of the pole, zero, and gain of the variable filter 560 to determine the characteristics of a variable filter 560 corresponding to disturbance frequencies frequency components may be derived during the system design process through testing.

The system controller 570 uses a lookup table with set parameter values to optimize the variable filter 560 according to frequency bandwidth, and varies the characteristics of the variable filter 560 as follows.

In an embodiment of the present general inventive concept, the system controller 570 analyzes the frequency components of a disturbance applied to the system. Provided are two methods of detecting the frequency components of the disturbance by the system controller 570.

The first method is to disable the disturbance observer 2000 and transform servo signals outputted from the plant 540 using the Fast Fourier Transformation (FFT), and designate the largest frequency components from the FFT transformed servo signals as disturbance frequency components. Accordingly, when the plant 540 is the head driving system of a disk drive, the servo signals outputted from the plant 540 may be a position error signal, for example.

The second method is by setting the frequency bandwidth of the disturbance observer 2000 as a wide bandwidth, transforming disturbance signals detected by the disturbance observer 2000 using the FFT, and designating the largest frequency components from the transformed detected disturbance signals as disturbance frequency signals.

After the disturbance frequency components are analyzed by the system controller 570, the parameter values to optimize the variable filter 560 corresponding to the analyzed disturbance frequency components are searched for in the lookup table.

The system controller 570 updates the parameter values to optimize the variable filter 560 set in the variable filter 560 of the disturbance observer 2000 with those found in the lookup table, so that the disturbance applied to the system can effectively be inhibited while not reducing the system's stability according to the environment in which the disk drive is used.

FIG. 6 is a flowchart illustrating an adaptive disturbance repressing method according to an embodiment of the present general inventive concept.

In operation 610, a system with a disturbance observer determines whether the system has been changed into a condition to optimize the disturbance observer. A condition to optimize the disturbance observer may be set as the initial condition of the system. Also, the condition to optimize the disturbance observer may also be set during an idle state of the system.

When it is determined in operation S610 that the system has been changed into the condition to optimize the disturbance observer, frequency components of the disturbances applied to the system are analyzed in operation S620.

In an embodiment of the present general inventive concept, the analysis of the disturbance frequency components involves a Fast Fourier Transforming of a servo signal that respond to a control signal and are outputted, with the disturbance observer of the system turned OFF, and designating the largest frequency components of the Fast Fourier transformed servo signal as disturbance frequency components. When the controlled system is a head driving system of a disk drive, the servo signal may be a position error signal in one instance. In another embodiment of the present general inventive concept, after setting the frequency bandwidth of the disturbance observer as a wide bandwidth, the disturbance signals detected by the disturbance observer are transformed using a FFT, and the largest frequency components from the transformed detected disturbance signals are designated as disturbance frequency signals.

In operation S630, parameter values to optimize the characteristics of the disturbance observer according to the disturbance frequency components detected in operation S620 are set. Accordingly, the parameters to optimize the characteristics of the disturbance observer may specifically be parameters corresponding to the pole, zero, and gain of the transfer function of the variable filter included in the disturbance observer. These parameter values may be taken from a lookup table with parameter value settings to optimize the variable filter included in the disturbance observer according to the disturbance frequency bandwidths.

The parameter values to optimize the characteristics of the disturbance observer that were obtained in operation S630 are applied to the disturbance observer in order to optimize the disturbance observer in operation S640. Accordingly, the obtained parameter values corresponding to the detected disturbance frequency components are used to update the parameters to determine the pole, zero, and gain of the variable filter included in the disturbance observer.

The characteristics of a variable filter included in a disturbance observer may thus be set to optimize the controlling of the system in accordance with the user environment.

Figure 10:
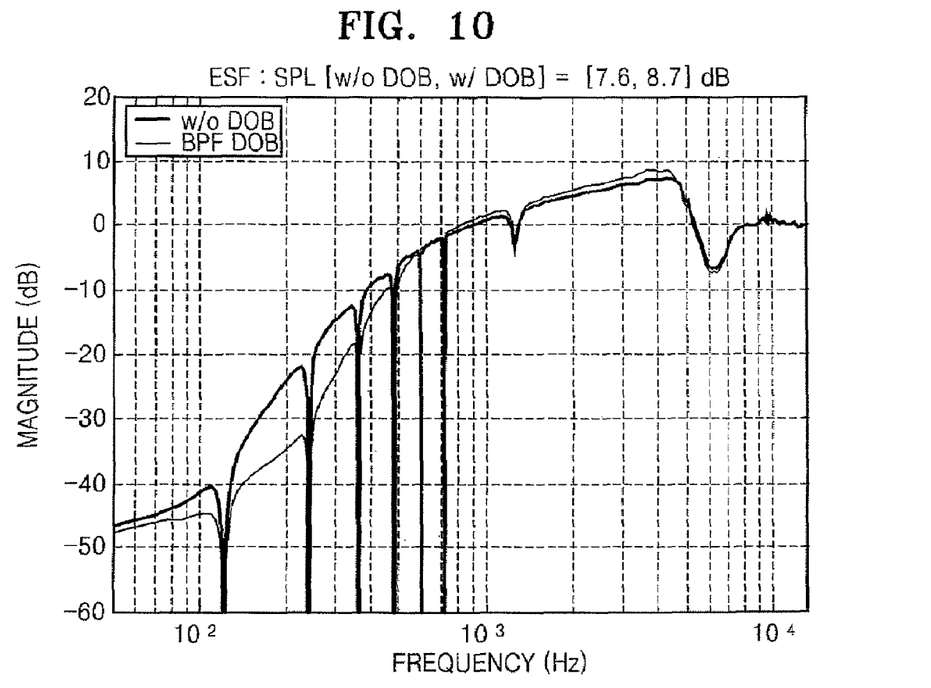
FIG. 10 is a graph illustrating characteristics of a sensitivity transfer function of a control loop when a disturbance observer with a variable filter according to an embodiment of the present general inventive concept is used.
Figure 11:
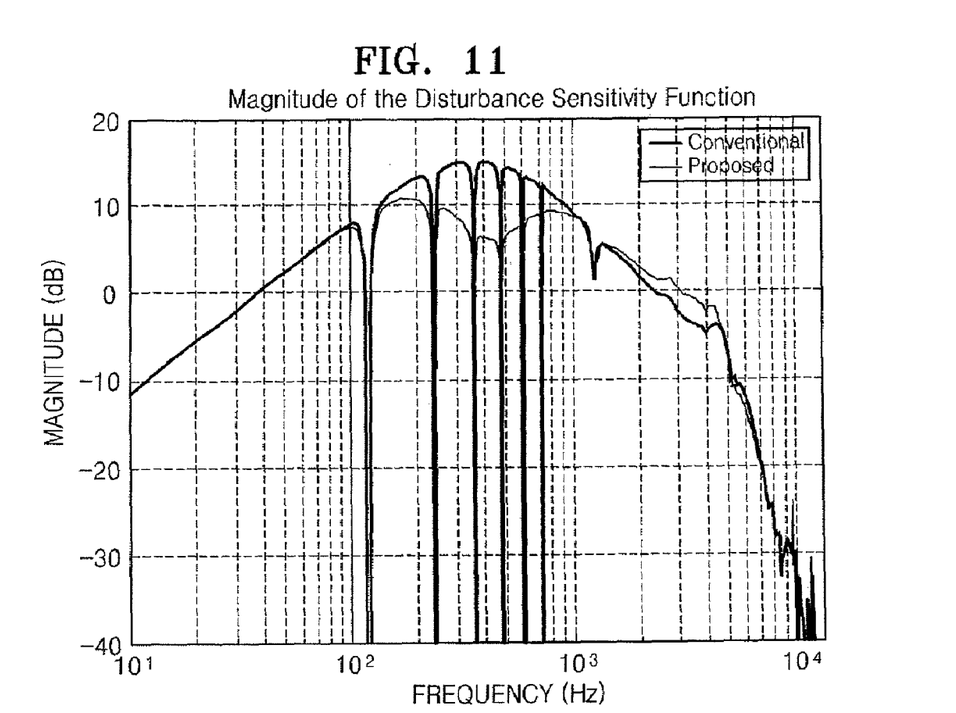
FIG. 11 is a graph illustrating characteristics of a disturbance sensitivity transfer function of a control loop when a disturbance observer with a variable filter according to an embodiment of the present general inventive concept is used.

For example, assuming that a large disturbance of 200-300 Hz caused by an external vibration is detected by the system controller 570, the lookup table is used to determine varying parameter values of the pole, zero, and gain of the variable filter to obtain the transfer function characteristics of the variable filter as illustrated in FIG. 9, so that the characteristics of the sensitivity transfer function illustrated in FIG. 10 and the characteristics of the disturbance sensitivity transfer function illustrated in FIG. 11 can be derived.

Comparing FIGS. 7 and 10, the controller used in the present general inventive concept sufficiently maintains a reliability margin while not generating unnecessary amplification for the sensitivity transfer function. Also, when comparing FIGS. 8 and 11, the controller used in the present general inventive concept has a superior disturbance repressing performance in a several hundred-Hertz bandwidth.

Table 1 below compares the disturbance repressing performance and the reliability margin of a conventional fixed low pass filter of a disturbance observer and a variable filter of a disturbance observer of the present general inventive concept that varies in terms of pole, zero, and gain according to the user environment

TABLE 1

|  | DSF (dB) | GM (dB) | PM (deg) | SPL (dB) | SPH (dB) |
| --- | --- | --- | --- | --- | --- |
| CONVENTIONAL LOW PASS | 11.6 | 3.24 | 36.18 | 10.79 | 1.84 |
| VARIABLE FILTER | 7.1 | 3.98 | 37.69 | 8.72 | 1.60 |

In Table 1, DSF is the value of the disturbance sensitivity function at 300 Hz, GM is the stability margin, PM is the phase margin value, SPL is the maximum value of the sensitivity transfer function, and SPH is the maximum value of the sensitivity transfer function in a high frequency range higher than a first resonating frequency.

In a conventionally configured controller using a compensating device such as a deflector, mutual interference between two controllers can make the system unstable. However, in the present general inventive concept, only the range needing disturbance prevention is sufficiently compensated for, so that the problems arising from interference between the two controllers does not occur.

Modern disk drive systems are used not only in their traditional roles as auxiliary memory devices in home and office desktop computers, but as stacked multi-disk disk drives used in servo format memory devices such as network attached storage (NAS), digital video recorders (DVR), set top boxes, high definition televisions (HDTVs), and other auxiliary memory devices for AV machines. Such diverse user environments of disk drives necessitates that the specifications of the disk drives be suitable for the various requirements of consumers. Accordingly, the disturbance repressing characteristics capable of repressing strong vibration-inflicted disturbances having a wide bandwidth between several hundred hertz to 1 KHz may be required, for example, with NAS. In contrast, in a disk drive for a desktop computer or DVR or when a hard disk drive vibrates due to a power supplying device, the disturbance repressing characteristics capable of repressing such strong vibration-inflicted disturbances having a bandwidth below 300 Hz may be required.

However, repressing disturbances having bandwidths of different frequencies can be fulfilled because the present general inventive concept incorporates the Q filter as a variable bandwidth pass filter in the disturbance observer.

Figure 12:
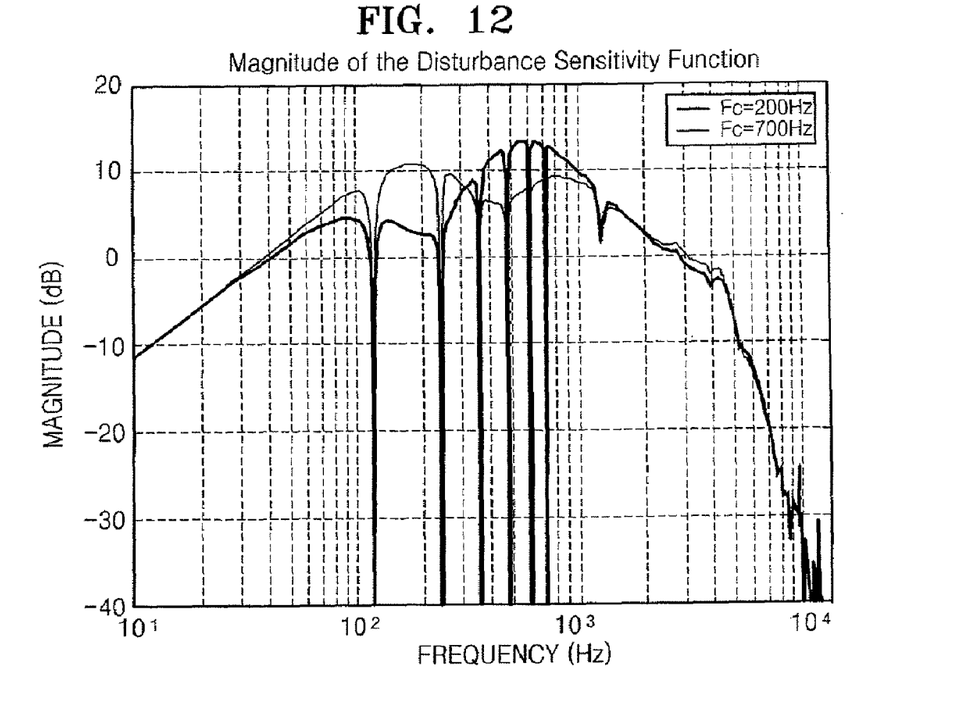
FIG. 12 is a graph illustrating respective characteristics of disturbance sensitivity transfer function when parameters of a variable filter of a disturbance observer corresponding to different disturbance frequencies (200 Hz and 700 Hz) are optimized according to an embodiment of the present general inventive concept.

FIG. 12 is a graph illustrating respective characteristics of disturbance sensitivity transfer functions when parameters of variable filters of disturbance observers corresponding to two different disturbance frequencies are used, according to an embodiment of the present general inventive concept. The disturbances in the frequency ranges in FIG. 12 can effectively be prevented.

The present general inventive concept can also be embodied as computer-readable codes on a computer-readable medium. The computer-readable medium may include a computer-readable recording medium and a computer-readable transmission medium. The computer-readable recording medium is any data storage device that can store data that can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

As described above, a filter in the disturbance observer according to several embodiments of the present general inventive concept is designed to adaptively vary according to the user environment, so that even when the user environment changes, the stability of the system is not compromised and the performance of the system can effectively be prevented from decreasing due to the disturbances.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of adaptively repressing disturbances, the method comprising:
   estimating one or more frequency components of a disturbance applied to a system when a disturbance observer is disabled or a frequency bandwidth of the disturbance observer is set as a wide bandwidth; and
   optimizing one or more parameter values determining characteristics of a variable filter included in the disturbance observer included in a servo control loop based on the estimated one or more frequency components of the disturbance.

2. The method of claim 1, wherein the estimating operation is performed during a system initializing process.

3. The method of claim 1, wherein the estimating operation further comprises:
   detecting a servo signal that responds to a servo control of the system and is outputted, with the disturbance observer in a disabled state;
   Fast Fourier Transforming the detected servo signal; and
   estimating a largest frequency component of the Fast Fourier Transformed detected servo signal to be a disturbance frequency component.

4. The method of claim 3, wherein the servo signal includes a position error signal in an on-track mode of a disk drive.

5. The method of claim 1, wherein the estimating operation further comprises:
   detecting a disturbance signal through the disturbance observer from a signal that responds to a servo control of the system and is outputted, with a frequency bandwidth of the disturbance observer of the system set as a broad bandwidth;
   Fast Fourier Transforming the detected disturbance signal; and
   estimating a largest frequency component of the Fast Fourier Transformed detected disturbance signal to be a disturbance frequency signal.

6. The method of claim 1, wherein the one or more parameter values correspond to one or more characteristics of a disturbance sensitivity transfer function.

7. The method of claim 1, wherein the one or more parameter values correspond to one or more characteristics of a variable filter included in the disturbance observer.

8. The method of claim 7, wherein the variable filter comprises a band pass filter.

9. The method of claim 7, wherein the one or more parameter values correspond to a pole, zero, and a gain of the variable filter.

10. The method of claim 1, wherein the optimizing operation further comprises:
    reading the one or more parameter values required to optimize a gain margin of a servo control system corresponding to the one or more frequency components estimated in the estimating operation and one or more disturbance repressing characteristics, from a look-up table; and
    varying the one or more parameter values required to determine a transfer function of a disturbance compensating control loop from the one or more parameter values read in the reading operation.

11. The method of claim 10, wherein the look-up table divides a disturbance frequency bandwidth into a plurality of bandwidths, and stores one or more determined parameter values that enable each of the plurality of bandwidths to have the optimized gain margin and the one or more disturbance repressing characteristic.

12. A computer-readable medium containing computer readable codes to perform an adaptive disturbance repressing method, the method comprising:
    estimating one or more frequency components of a disturbance applied to a system when a disturbance observer is disabled or a frequency bandwidth of the disturbance observer is set as a wide bandwidth; and
    optimizing one or more parameter values determine characteristics of a variable filter included in the disturbance observer included in a servo control loop based on the estimated frequency components of the disturbance.

13. The method of claim 12, wherein the estimating operation further comprises:
    detecting a servo signal that responds to a servo control of the system and is outputted, with the disturbance observer in a disabled state;
    Fast Fourier Transforming the detected servo signal; and
    estimating a largest frequency component of the Fast Fourier Transformed detected servo signal to be a disturbance frequency component.

14. The method of claim 12, wherein the estimating operation further comprises:
  detecting a disturbance signal through the disturbance observer from a signal that responds to a servo control of the system and is outputted, with a frequency bandwidth of the disturbance observer of the system set as a broad bandwidth;
  Fast Fourier Transforming the detected disturbance signal; and
  estimating a largest frequency component of the Fast Fourier Transformed detected disturbance signal to be a disturbance frequency component.

15. The method of claim 12, wherein the optimizing operation comprises:
  reading the one or more parameter values required to optimize a gain margin of a servo control system corresponding to the one or more frequency components estimated in the estimating operation and one or more disturbance repressing characteristics, from a look-up table; and
  varying one or more parameter values required to determine a transfer function of a disturbance compensating control loop from the one or more parameter values read in the reading operation.

16. An adaptive disturbance repressing apparatus, comprising:
  a disturbance observer to receive a control input signal to control a plant and a servo output signal of the plant corresponding to the control input signal, and to estimate a disturbance value applied to the plant as a variable disturbance sensitivity transfer function according to one or more parameter values of a variable filter disposed at a feedback of a control loop;
  a subtracter to subtract the disturbance value estimated by the disturbance observer from a control signal generated in the control loop, and to generate the control input signal to control the plant; and
  a controller to estimate a frequency component of a disturbance applied to the plant in a system when a disturbance observer is disabled or a frequency bandwidth of the disturbance observer is set as a wide bandwidth, and to vary the one or more parameter values of the variable filter based on the frequency component of the disturbance.

17. The adaptive disturbance repressing apparatus of claim 16, wherein the variable filter is a variable band pass filter.

18. The adaptive disturbance repressing apparatus of claim 16, wherein the disturbance observer further comprises:
  a nominal plant inverse modeling tool having response characteristics, to receive a servo output signal of the plant and output a sum of the control input signal of the plant and the disturbance value applied to the plant;
  a subtracter to subtract the control input signal of the plant from the output signal of the nominal plant inverse modeling tool; and
  a variable filter to receive and to filter the subtracted output signal of the subtracter with one or more frequency characteristics corresponding to the varied one or more parameter values of the variable filter.

19. The adaptive disturbance repressing apparatus of claim 16, wherein the one or more parameter values of the variable filter corresponding to a pole, zero, and a gain of the variable filter.

20. The adaptive disturbance repressing apparatus of claim 16, wherein the controller Fast Fourier Transforms the servo signal outputted from the plant with the disturbance observer disabled, and estimates a largest frequency component of the Fast Fourier Transformed servo signal to be the disturbance frequency component.

21. The adaptive disturbance repressing apparatus of claim 16, wherein the controller Fast Fourier Transforms the disturbance value estimated by the disturbance observer with a frequency bandwidth of the disturbance observer set as a wide bandwidth, and estimates a largest frequency component of the Fast Fourier Transformed disturbance signal to be the disturbance frequency component.

22. The adaptive disturbance repressing apparatus of claim 16, wherein the controller uses a look-up table to obtain one or more parameter values corresponding to the estimated disturbance frequency component, and to replace the one or more parameter values of the variable filter with the obtained one or more parameter values from the look-up table.

23. The adaptive disturbance repressing apparatus of claim 22, wherein the look-up table divides a disturbance frequency bandwidth into plurality of bandwidths, and stores the obtained one or more parameter values that enable each of the plurality of bandwidths to have an optimized disturbance repressing characteristic.

24. A disk drive apparatus, comprising:
  a disk to store data;
  a head to write the data on the disk or to read the data from the disk;
  a servo controller to estimate head movement state data values including a position value, a speed value, and a bias value of the head from a servo signal read by the head, and to generate a control signal based on the estimated head movement state data values;
  a disturbance observer using an inverse of a function modeling a head driving system to estimate a disturbance value applied to the head driving system from the servo signal through one or more disturbance sensitivity transfer function characteristics that vary according to one or more parameter values of a variable filter disposed at a feedback of a control loop;
  a subtracter to subtract the disturbance value estimated by the disturbance observer from the control servo signal, and to generate a disturbance compensating control signal;
  a voice coil motor (VCM) driver to generate a current to move the head according to the disturbance compensating control signal; and
  a system controller to estimate a disturbance frequency component applied to the head driving system in a user environment, and optimizing the one or more parameter values of the variable filter based on the frequency component of the estimated disturbance applied to the head driving system in a system when a disturbance observer is disabled or a frequency bandwidth of the disturbance observer set as a wide bandwidth.

25. The apparatus of claim 24, wherein the variable filter is a variable band pass filter.

26. The apparatus of claim 24, wherein the disturbance observer further comprises:
  a nominal plant inverse modeling tool having response characteristics, to receive a servo output signal of the head driving system and output a sum of the control input signal of the head driving system and the disturbance value applied to the head driving system;
  a subtracter to subtract the control input signal of the head driving system from the output signal of the nominal plant inverse modeling tool; and a variable filter to receive and to filter the subtracted output signal with one or more frequency characteristics corresponding to the one or more parameter values of the variable filter.

27. The apparatus of claim 24, wherein the one or more parameter values of the variable filter corresponding to a pole, zero, and a gain of the variable filter.

28. The apparatus of claim 24, wherein the servo system controller Fast Fourier Transforms the servo signal generated from the head driving system with the disturbance observer disabled, and estimates a largest frequency component of the Fast Fourier Transformed servo signal to be the disturbance frequency component.

29. The apparatus of claim 28, wherein the servo signal includes a position error signal.

30. The apparatus of claim 24, wherein the servo system controller Fast Fourier Transforms the disturbance value estimated by the disturbance observer with a frequency bandwidth of the disturbance observer set as a wide bandwidth, and estimates a largest frequency component of the Fast Fourier Transformed disturbance signal to be the disturbance frequency component.

31. The apparatus of claim 24, wherein the servo system controller uses look-up data to obtain one or more parameter values corresponding to the estimated disturbance frequency component, and replaces the one or more parameter values of the variable filter with the obtained one or more parameter values from the look up table.

32. The apparatus of claim 31, wherein the look-up table divides a disturbance frequency bandwidth into a plurality of bandwidths, and stores the obtained one or more parameter values that enable each of the plurality of bandwidths to have an optimized disturbance repressing characteristic.

* * * * *